(12) United States Patent
Bae

(10) Patent No.: US 6,234,557 B1
(45) Date of Patent: May 22, 2001

(54) AUTOMOTIVE FILLER CAP ASSEMBLY

(75) Inventor: Han Bae, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/527,151

(22) Filed: Mar. 17, 2000

(30) Foreign Application Priority Data

Jun. 11, 1999 (KR) .................................................. 99-21698

(51) Int. Cl.$^7$ .................................................. B62D 39/00
(52) U.S. Cl. ..................................... 296/97.22; 220/86.2
(58) Field of Search .................... 296/97.22; 220/86.2, 220/DIG. 33; 280/834

(56) References Cited

U.S. PATENT DOCUMENTS

| | | | | |
|---|---|---|---|---|
| 5,253,920 | * | 10/1993 | Eldridge | ............................ 296/97.22 |
| 5,451,927 | * | 9/1995 | Thompson | ........................ 220/86.2 X |
| 5,988,238 | * | 11/1999 | Palvolgyi | ......................... 220/86.2 X |

\* cited by examiner

Primary Examiner—Joseph D. Pape
(74) Attorney, Agent, or Firm—Christie, Parker & Hale, LLP

(57) ABSTRACT

A filler cap assembly includes a filler cap for opening and closing a fuel inlet, a first detecting arrangement for detecting if a fuel tank door is opened or not, a second detecting arrangement for detecting if the filler cap is placed in the fuel inlet, and an actuating arrangement for opening and closing the filler cap according to signals from the first and second sensors.

6 Claims, 3 Drawing Sheets

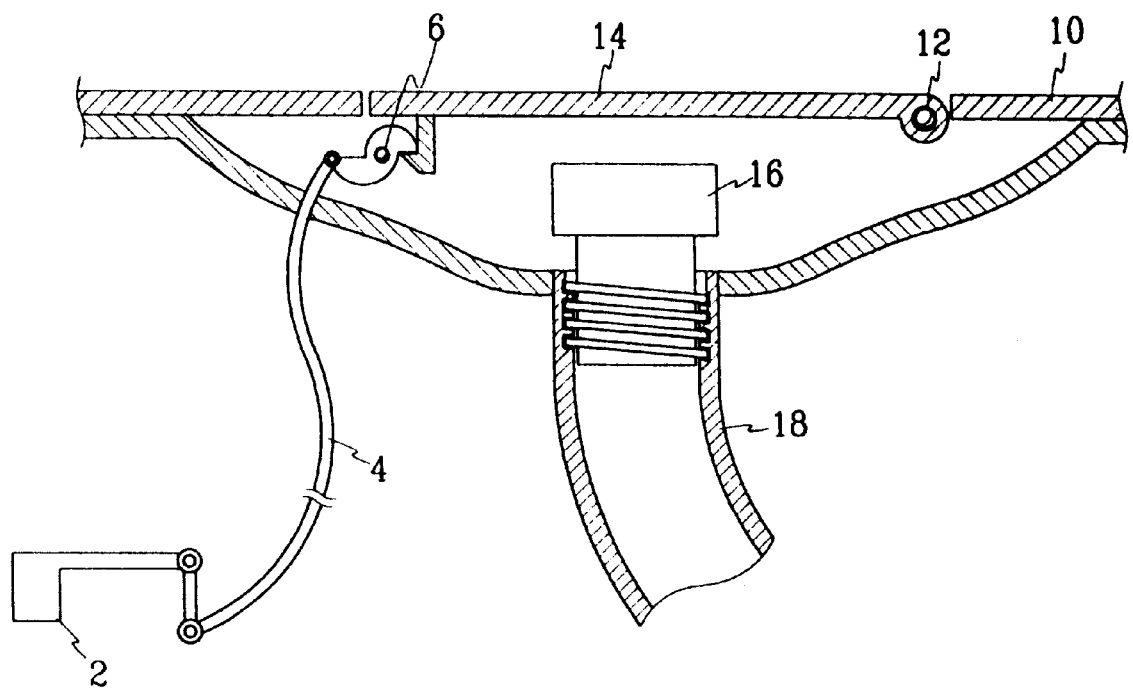

AUTOMOTIVE FILLER CAP ASSEMBLY

BACKGROUND OF THE INVENTION (a) Field of the Invention

The present invention relates to a filler cap assembly, and in particular, to a filler cap assembly for fuel tanks of automobiles, which automatically opens with a fuel tank door when an opening lever is manipulated.

(b) Description of the Related Art

Cap assemblies for fuel tanks are well known. Typically, a fuel tank has an opening in a side thereof, a substantially cylindrical tube with a threaded end is inserted into the opening and fixed to the tank, and a filler cap is screwed on to the threaded end.

FIG. 3 shows a prior art cap assembly. As shown in FIG. 3, a fuel inlet of a tube 18 which is connected to a fuel tank is secured in a recess formed on an exterior panel 10 of a vehicle and is sealed by a filler cap 16. The filler cap 16 is protected by a fuel tank door 14 which is pivotally connected to the panel 10 and biased in its opening direction by a torsion spring 12. The fuel tank door 14 is held closed by a locking device 6 that hooks on a protrusion formed on an inner surface of the fuel tank door 14. The locking device 6 is connected to an opening lever 2 arranged in a driver's compartment by a cable 4 such that the locking device 6 unlocks if a driver pulls the opening lever 2 to open the fuel tank door.

In this case, the fuel tank is opened by the driver's manipulation from within the vehicle, but the filler cap 16 is manually opened and closed by a service station attendant when refilling the fuel tank, so the driver cannot ensure that the inlet opening is completely sealed.

SUMMARY OF THE INVENTION

The present invention has been made in an effort to solve the above problems of the prior art.

It is an object of the present invention to provide a filler cap assembly which is automatically opened with and at the same time as a fuel tank door by a driver's manipulation of an opening lever.

To achieve the above object, the filler cap assembly comprises a first sensor mounted to one end portion of a cable that connects an opening lever to a fuel tank door locking device, the first sensor detecting if the opening lever is operated to open the fuel tank door, an actuator mounted near a fuel inlet for selectively generating rotational force and being electrically connected to a battery when the first sensor detects that the opening lever is operated to open the fuel tank door; a filler cap fitted into a fuel inlet and connected to the actuator by means of a gear mechanism such that the filler cap screws into or out of the inlet according to a direction of the rotational force generated by the actuator, and a second sensor mounted inside the fuel inlet for detecting if the filler cap is fitted into the fuel inlet, the second sensor electrically connecting the actuator to the battery if the filler cap is fitted into the fuel inlet.

BRIEF DESCRIPTION OF THE DRAWINGS

The accompanying drawings, which are incorporated in and constitute a part of the specification, illustrate an embodiment of the invention, and together with the description, serve to explain the principles of the invention:

FIG. 3 is a front cross sectional view showing a prior art filler cap assembly.

DETAILED DESCRIPTION OF THE PREFERRED EMBODIMENTS

A preferred embodiment of the present invention will be described hereinafter with reference to the accompanying drawings.

Figure 1:
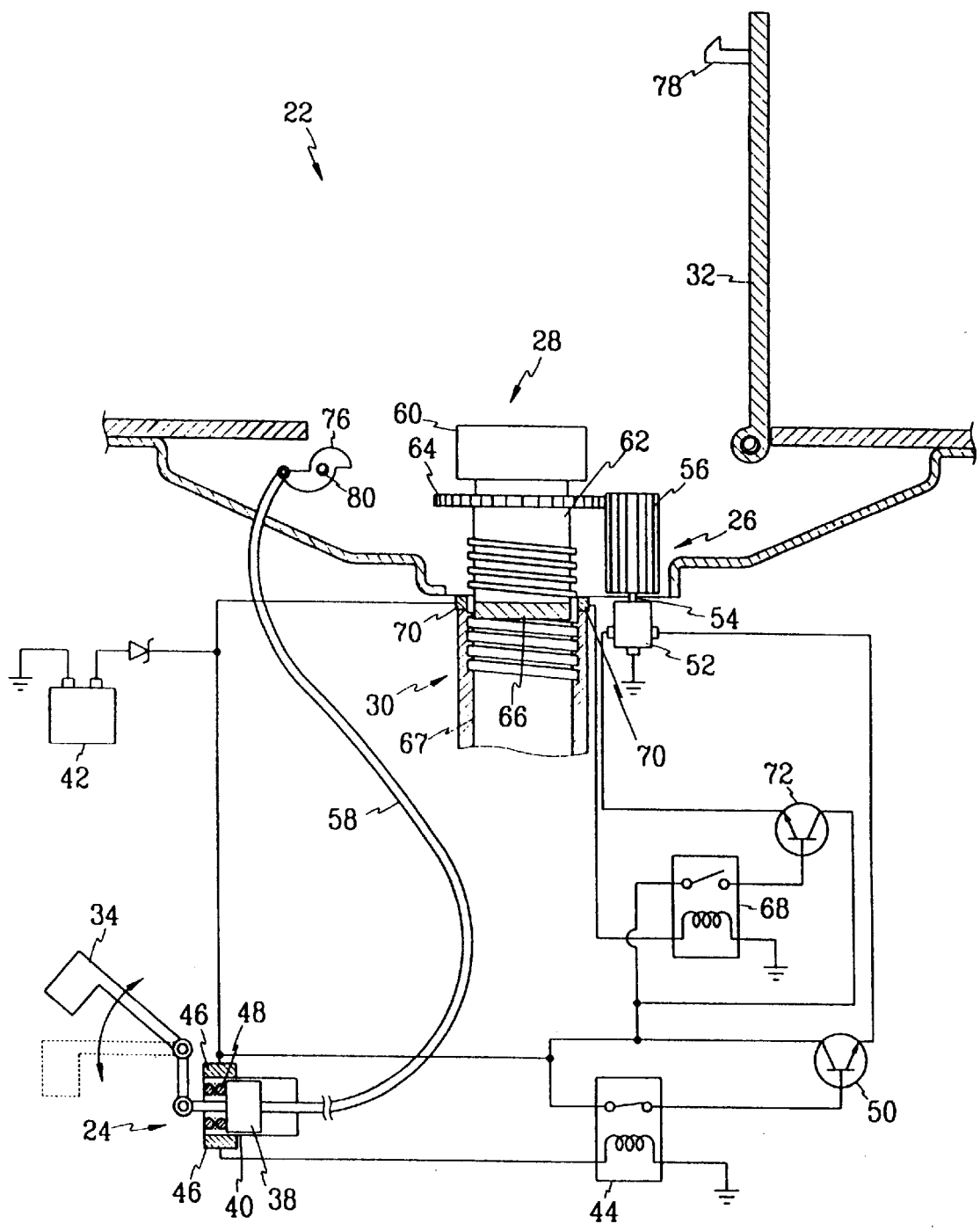
FIG. 1 is a front cross-sectional view showing a filler cap assembly in an open state according to a preferred embodiment of the present invention.
Figure 2:
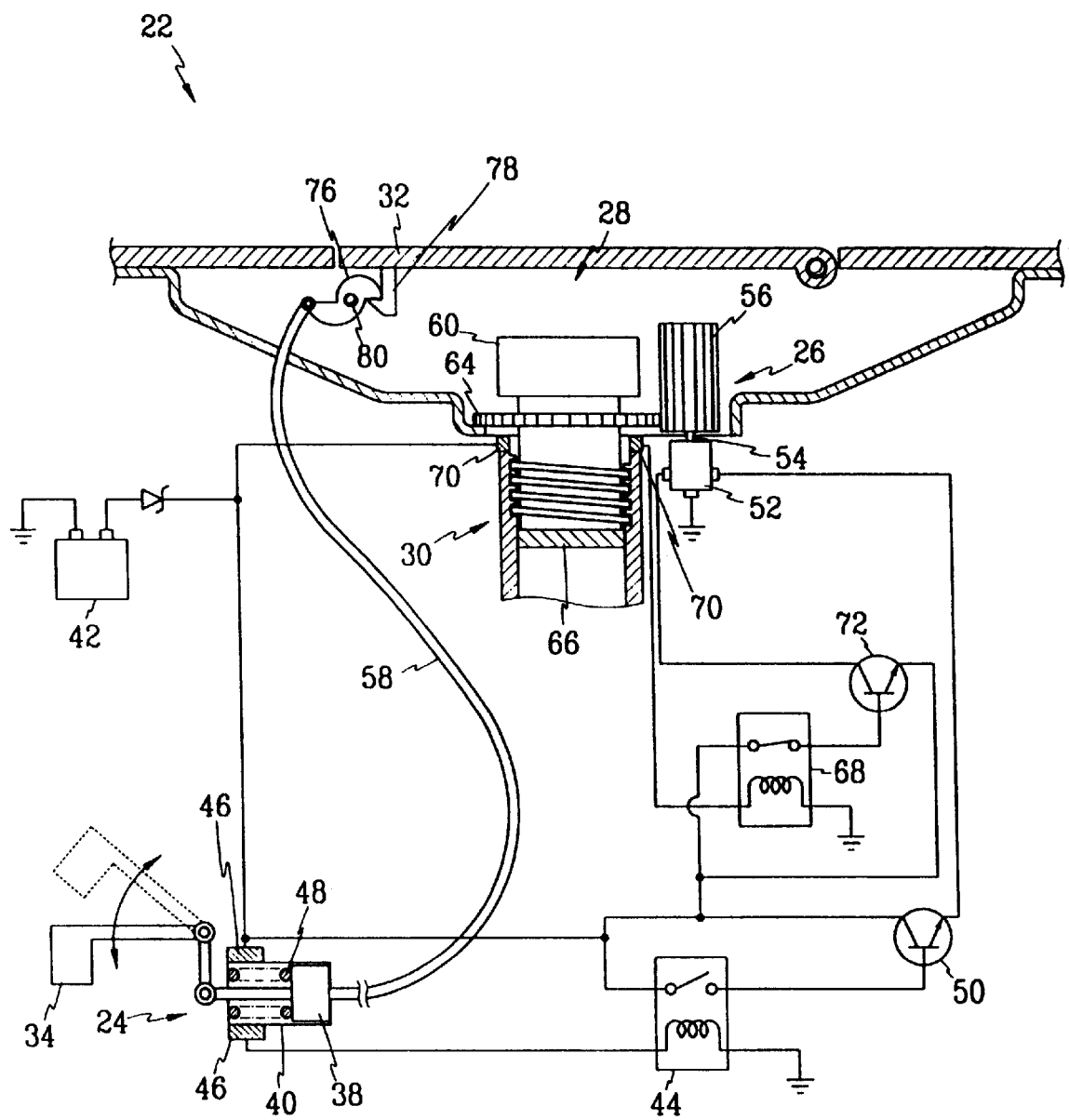
FIG. 2 is a front cross-sectional view showing a filler cap assembly of FIG. 1 in a closed state.

FIG. 1 and FIG. 2 show a filler cap assembly respectively as opened and closed according to a preferred embodiment of the present invention.

As shown in FIG. 1, the filler cap assembly 22 comprises a first sensor 24, an actuator 26, a filler cap 28, and a second sensor 30.

The first sensor 24 is mounted to one end portion of a connection cable 58 near an opening lever 34 provided in a driver's compartment. The sensor 24 includes a first conductor 38 fixed to the cable 58 and slidably housed in a cylindrical housing 40, and two first sensor terminals 46 mounted around an opening lever portion of the housing 40 such that an electric connection is established therebetween when the first conductor 38 adjoins the two first sensor terminals 46. One first sensor terminal 46 is electrically connected to a battery 42 and another is connected to a first relay 44. The first conductor 38 is biased by a coil spring 48 that is installed in the housing 40.

The actuator 26 is provided with a motor 52 that is electrically connected to the two first sensor terminals 46 of the first sensor 24 via the first relay 44 and a first transistor 50, and a long driving gear 56 is fixed to a rotational shaft of the motor 52 such that the driving gear 56 rotates when an electric connection is established between the first sensor 24 and the motor 52.

The filler cap 28 is formed with a body 62 that is threaded on its lower portion so as to be screwed into a fuel inlet 67, a head 60 formed at an upper end of the body 62, a second conductor 66 fixed to the lower end of the body 62, and a driven gear 64 mounted around an upper portion of the body 62 so as to be engaged with the driving gear 56 of the actuator 26 such that the filler cap is actuated if the motor 52 of the actuator 26 generates a rotational force.

The second sensor 30 is provided with two second sensor terminals 70 mounted inside the fuel inlet and electrically connected to the battery 42 and second relay 68 respectively, such that an electric connection is established when is the second conductor 66 is located between the two second sensor terminals 70 when the filler cap 28 is placed in the fuel inlet.

The operation of the filler cap assembly according to the present invention will be described hereinafter.

FIG. 2 shows the filler cap assembly as closed. In this state, if the opening lever 34 is pulled, a locking device 76 that is pivotally connected to an end of the cable 58 and hooked on a hook 78 formed on an inner surface of the fuel tank door 32 is released such that the fuel tank door 32 is opened by an elastic force of a torsion spring arranged with a hinge mechanism which pivotally connects the fuel tank door 32 to the vehicle body. At the same time, the first conductor 38 which is fixed on the cable 58 moves in the opening lever direction against the coil spring 48 and connects the two first sensor terminals such that electrical continuity is established between the battery 42 and the motor 52 of the actuator via the first relay 44 and the first transistor 50. Electric current from the battery 42 is amplified by the first transistor 50 and then supplied to the motor 52 of the actuator 26 such that the motor 52 generates rotational force to rotate the driving gear 56. Accordingly, the filler cap 28 is screwed out of the inlet pipe by the driven gear 64 engagement with the rotating driving gear 56.

The filler cap 28 is designed in such way that when it is screwed out it remains in place on the inlet opening so that a service station attendant can remove it and refill the fuel tank. After filling the fuel tank, the attendant simply need place the filler cap 26 on the fuel inlet 30 and close the fuel tank door 32.

If the filler cap 26 is placed on the fuel inlet 30, the second conductor 66 is located between the two second sensor terminals 70 of the second sensor 30 such that the battery 42 and the motor 52 of the actuator 26 are electrically connected to each other via a second relay 68 and a second transistor 72.

Electric current from the battery 42 is amplified by the second transistor 72 and then supplied to the motor 52 of the actuator 26 such that the motor 52 generates rotational force to rotate the driving gear 56 in a direction opposite to the first rotational direction thereof. Accordingly, the filler cap 28 is screwed into the inlet pipe by the driven gear 64 engagement with the rotating driving gear 56 such that the inlet pipe becomes sealed.

When the fuel tank door 32 is closed, the hook 78 of the fuel tank door 32 pushes the arc-shaped upper surface of the free end of the locking device 76 such that the locking device 76 rotates around a pin 80 that is fixed to the vehicle body, and once it is clear of the hook 78, spring pressure from the spring 48 pulls the locking device 76 into a locked position with respect to the hook 78. Accordingly, the opening lever 34 returns to its initial position.

As described above, in the filler cap assembly according to the preferred embodiment of the present invention, since the filler cap and the fuel tank door are opened at the same time by the driver's manipulation, and the filler cap is opened and closed at a predetermined speed and rotational force, sealing the fuel inlet is promptly and precisely fulfilled, and furthermore the driver can check if the inlet opening is completely sealed by monitoring the position of the opening lever.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A filler cap assembly comprising:

a filler cap for opening and closing a fuel inlet;

first means for detecting if a fuel tank door is opened or not;

second means for detecting if the filler cap is placed in the fuel inlet; and means for actuating the filler cap according to signals from the first and second sensors.

2. A filler cap assembly of claim 1 wherein the filler cap comprises a body that is threaded on its lower portion so as to be screwed into a fuel inlet, a cap head formed at an upper end of the body, a second conductor fixed to a lower end of the body, and a driven gear mounted around an upper portion of the body so as to be engaged with the driving gear of the actuator.

3. A filler cap assembly of claim 1 wherein the actuating means is mounted near a fuel inlet for selectively rotating the filler cap and being electrically connected to a battery when the first detecting means detects that the opening lever is operated for opening the fuel tank door.

4. A filler cap assembly of claim 1 wherein the first detecting means comprises a first conductor fixed to the cable and slidably housed in a cylindrical housing, and two first sensing terminals mounted around the housing such that an electric connection is established between the first two sensing terminals when the first conductor is located between the first two sensing terminals.

5. A filler cap of claim 1 wherein the second detecting means comprises a pair of sensing terminals arranged with a predetermined distance therebetween for establishing an electric connection between a battery and the actuator when the second conductor of the filler cap is located between the second sensing terminals.

6. A filler cap assembly of claim 1 wherein the actuating means comprises a motor electrically connected to a pair of sensing terminals and a long driving gear fixed to a rotational shaft of the motor.

* * * * *